A. D. HEDGES.
AUTOMOBILE TOP.
APPLICATION FILED DEC. 15, 1919.
1,390,556.
Patented Sept. 13, 1921.
2 SHEETS—SHEET 2.
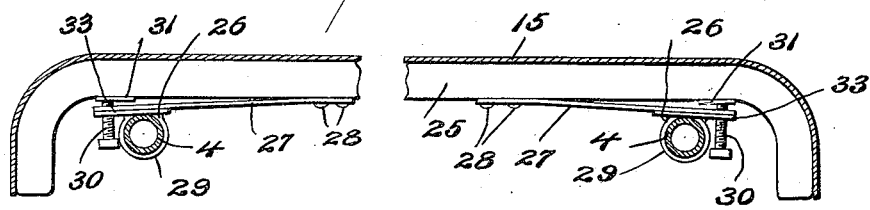
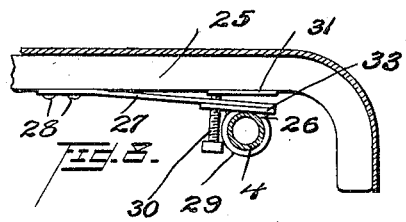
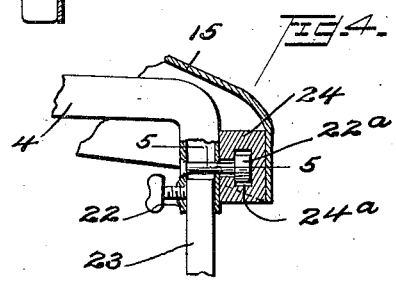
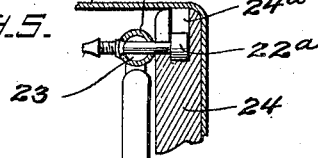
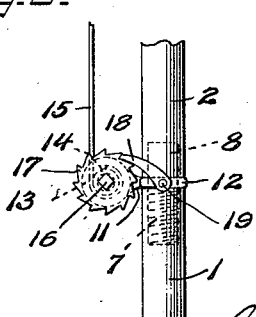
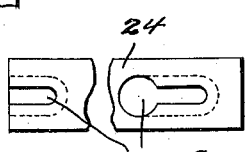
Inventor
Abraham D Hedges
By
Attorney

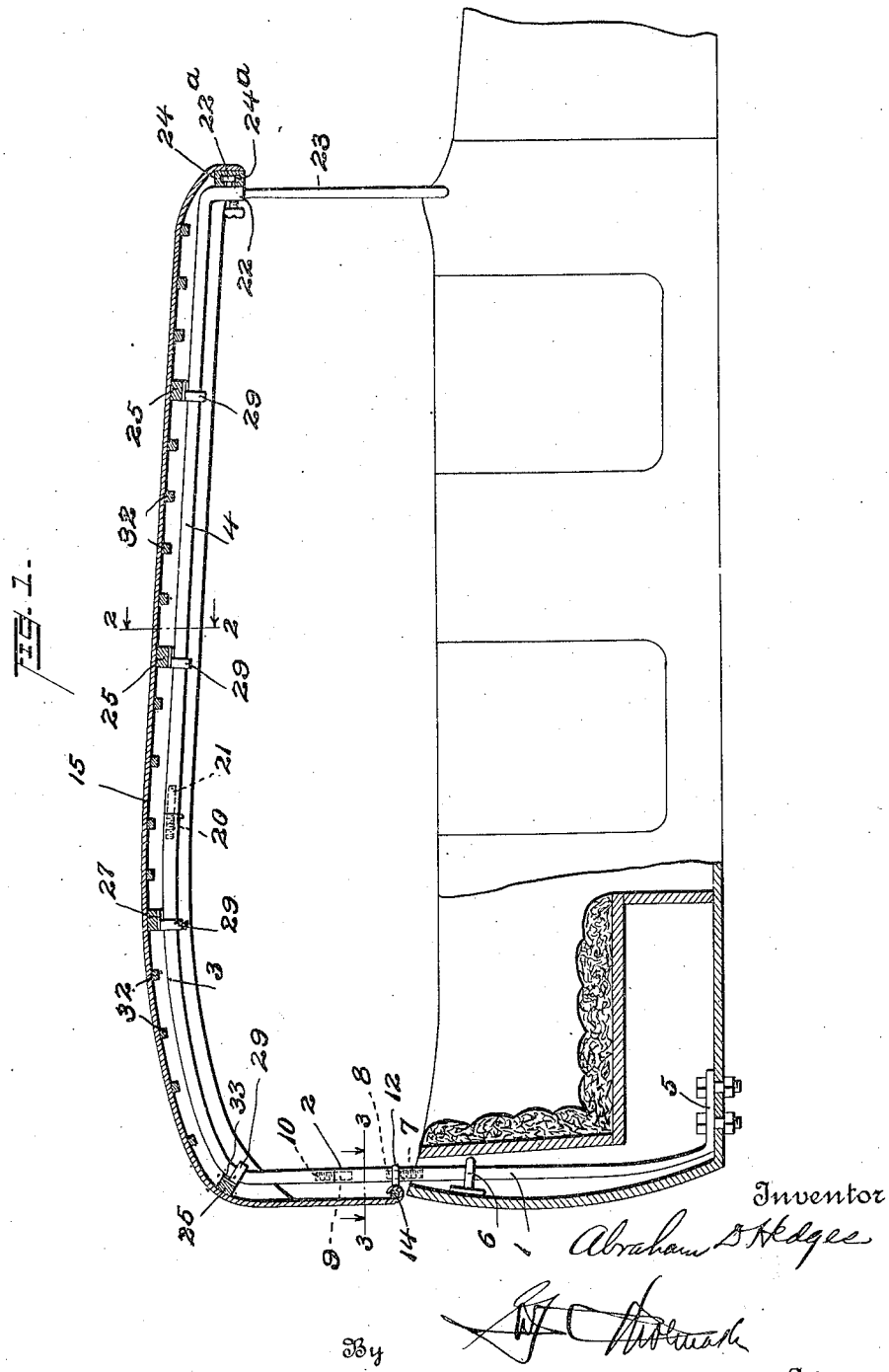

UNITED STATES PATENT OFFICE.

ABRAHAM D. HEDGES, OF LONG BEACH, CALIFORNIA.

AUTOMOBILE-TOP.

1,390,556.  Specification of Letters Patent. Patented Sept. 13, 1921.

Application filed December 15, 1919. Serial No. 345,103.

*To all whom it may concern:*

Be it known that I, ABRAHAM D. HEDGES, a citizen of the United States, residing at Long Beach, in the county of Los Angeles and State of California, have invented certain new and useful Improvements in Automobile-Tops, of which the following is a specification.

The invention relates to improvements in automobile tops.

The object of the present invention is to improve the construction of one-man automobile tops and to increase their strength, durability and efficiency, and to provide a simple, practical and efficient construction adapted to be readily installed on an automobile without marring or necessitating any alteration in the construction of the same, and capable of being readily arranged for use, and of being easily and quickly folded when desired.

A further object of the invention is to provide improved means for tensioning the cover without changing the position of the front end of the same with relation to the wind shield and to distribute the strain through the cover so as not to subject any portion of the same to undue strain.

It is also an object of the invention to enable the cover to be readily tightened to prevent any wrinkling of the same, and also to take up any slack due to the stretching of the cover during use.

Furthermore, the invention has for its object to enable the cover to be folded without removing the top frame and also to permit the top frame to be quickly removed when desired.

With these and other objects in view, the invention consists in the construction and novel combination and arrangement of parts hereinafter fully described, illustrated in the accompanying drawings and pointed out in the claims hereto appended, it being understood that various changes in the form, proportion, size and minor details of construction, within the scope of the claims, may be resorted to without departing from the spirit of the invention or sacrificing any of the advantages thereof.

In the accompanying drawings, in which like characters of reference designate corresponding parts in the several figures:

Figure 1 is a longitudinal sectional view of an automobile top constructed in accordance with this invention and shown applied to an automobile body, the latter being partly in section, and the flexible cover being extended and arranged for use;

Fig. 2 is a transverse sectional view on the line 2—2 of Fig. 1;

Fig. 3 is a horizontal sectional view on the line 3—3 of Fig. 1;

Fig. 4 is an enlarged detail transverse sectional view of the front end of the automobile top;

Fig. 5 is a detail horizontal sectional view of the same; and

Fig. 6 is an enlarged detail sectional view illustrating the construction of the ratchet device for stretching and securing the rear end of the flexible cover.

Fig. 7 is a detail view of a section of the front bow showing slot into which the attaching means is inserted;

Fig. 8 is a detail sectional view of the cover-stretching mechanism.

In the accompanying drawing, in which is illustrated the preferred embodiment of the invention, the top frame of the automobile top is composed of two longitudinal tubular members each comprising a rear fixed section 1, a short coupling section 2, a curved or bent section 3 and a front section 4. The rear section extends upwardly from the bottom of the body 2 of an automobile to substantially flush relation with the upper end of the back and the top of the rear seat and it is slightly bent at an intermediate point, as shown, and it is provided at the lower end with an attaching portion 5 which is bolted or otherwise secured to the bottom of the automobile body. This will enable the top frame of the automobile body to be readily applied to the body of an automobile without marring the same or necessitating any alteration in the construction of the body. The upper end of the rear section 1 may be secured to the body by a strap or clip 6, or any other suitable means, and it is interiorly threaded for the reception of a lower threaded portion 7 of a plug or pin which has a smooth upper portion 8 fitting in the lower end of the coupling section 2, which also receives a smooth portion 9 of a pin or plug 10, which is threaded into the lower end of the curved or bent section 3. The said smooth portion 8 has also mounted on it a bearing bracket 11 having vertical and horizontal eyes or rings 12 and 13. The vertical eye or ring 12 may be secured to the said smooth portion 8 in any desired manner and the horizontal eye or ring 13 forms a bearing for a transverse shaft 14 which has attached to it the rear end of a flexible cover 15. The shaft 14, which is adapted to be rotated to stretch the cover, is provided with a square terminal 16 for the reception of a crank wrench or other suitable tool for rotating the shaft. The square terminal 16 also has mounted on it a ratchet wheel 17 which is engaged by a gravity pawl or dog 18 pivotally mounted on a headed pin or stud 19 of the bearing bracket 11. The headed pin or stud preferably projects from the outer side of the vertical eye or ring 12 at one side of the automobile top. The ratchet wheel may, however, be fixed to the transverse shaft in any other desired manner.

The front end of the curved or bent section 3 receives a threaded pin or plug 20 which has a smooth projecting portion 21 extending into the rear end of the front section 4. The front end 22 of the front section 4 is bent downwardly substantially at right angles to form an elbow or hook for engagement over the upper end of the wind shield post 23 and the said downwardly bent end 22 is provided with a set screw 22ª or other headed device adapted to extend into an approximately T-shaped recess 23 of the front bow 24 of the automobile top. The front bow fits against the downwardly bent terminals 22 of the side members and is interlocked with the same by means of the headed projections formed by the set screws. When the cover is placed under tension by the rear shaft and the auxiliary stretching means hereinafter described, the front bow will be maintained firmly in its interlocked relation with the front ends of the side members of the top frame, and they will be effectually prevented from becoming accidentally disconnected therefrom until the tension on the cover is removed sufficiently to allow disengagement of the front bow from the set screws.

The flexible cover is provided at intervals with main bows 25 which are connected with sliding brackets 26 by plate springs 27 extending along the side portions of the main bows and secured at their inner ends to the lower faces of the main bows by screws 28 or other suitable fastening devices. The outer ends of the springs 27 are riveted or otherwise secured to the brackets 26 which have eyes or rings 29 slidable on the side members of the top frame. The springs 27 are equipped adjacent to the brackets with adjusting screws 30 threaded in the springs and provided at their lower ends with suitable heads or operating portions and having their upper ends bearing against plates 31 secured to the lower faces of the main bows and adapted to prevent the same from being worn by the screws when the main bows are constructed of wood, but the said main bows may be constructed of any suitable material, as will be readily understood. The flexible cover is also provided at intervals between the main bows with auxiliary bows or slats 32 adapted to maintain the flexible cover transversely seretched in proper form. The springs may be provided with a plate or thickened portion 33 for the threading of the screws, and the latter may be arranged either at the outer side or inner side of the sliding brackets. These screws enable the strain on the cover to be distributed throughout the entire length of the automobile top, and will maintain the top in a smooth condition and enable any wrinkling of the top due to stretching, to be readily removed. The adjusting screws and the rear transverse shaft distribute the tension and strain throughout the automobile cover so that the latter is not subjected at any one point to excessive strain and the cover may be stretched to the desired tension without changing the position of the front bow with relation to the wind shield. By this construction and operation the front bow will remain in a predetermined position in all adjustments of the automobile cover due to tensioning of the same, and coil springs and other auxiliary tensioning means for forcing the front end of the cover outwardly will be eliminated.

A single piece, permanently mounted frame, that is, a top frame in which the side members are made from a continuous piece of tubular or other metal may be employed. Also in the use of the threaded plugs the smooth portions of the plugs may be tightly driven into the sections and the threaded portions of the plugs used as a detachable connection or the smooth portion may be used to provide a quick adjustable connection for permitting the sections to be readily separated.

What is claimed is:—

1. An automobile top including a flexible cover, a top frame composed of fixed rear sections provided at their lower ends with attaching means for securing them to the lower portion of an automobile body in rear of the back seat, a short coupling section, a bent, forwardly extending section, and pins connecting the sections and threaded at one end, and cover stretching means mounted on the pins and retained in place by the sections and connected with the said flexible cover.

2. An automobile top including a top frame having side members composed of sections, pins connecting the sections, bearing brackets having eyes or rings fitted on the said pins and detachably secured to the frame by said pins and sections, a transverse shaft journaled in the bearing brackets, and a flexible cover connected to the transverse shaft and adapted to be stretched by the same.

3. An automobile top including a top frame having side members composed of sections, pins connecting the sections, bearing brackets having vertical and horizontal rings or eyes, the vertical eyes being fitted on the said pins, one of the bearing brackets being provided with a projecting pivot, a transverse shaft journaled in the horizontal eyes or rings, a ratchet wheel mounted on the shaft, a pawl or dog mounted on the pivot and engaging the ratchet wheel, and a flexible cover connected with the transverse shaft and adapted to be stretched by the same.

4. An automobile top including a top frame composed of side members having depending front terminals for engaging the wind shield posts of an automobile, means for detachably securing the side members to the windshield posts, headed projections extending from the depending end of the side members, and a cover having a front bow fitted against the depending ends of the said members and provided with recesses detachably receiving the headed projections and interlocking the front bow with the said depending ends, said front bow being engaged with and disengaged from the headed projections by movement laterally of the automobile top.

5. An automobile top including a top frame, a bracket slidable on the top frame, a cover having a bow, and manually operable exteriorly arranged means for adjustably connecting the cover with the bracket for stretching the said cover, said means being located intermediate the ends of the bow and engaging the same.

6. An automobile top including a top frame, a bracket slidable on the top frame, a cover having a bow, an exteriorly arranged spring extending along the bow and connected with the same and with the bracket, and adjusting means connected with the bracket and engaging the bow between the ends thereof.

7. An automobile top including a top frame, a bracket slidable on the top frame, a cover having a bow, a spring extending along the bow and connected with the same and with the bracket, and an adjusting device for connecting the spring with the bow to stretch the cover.

8. An automobile top including a top frame, a bracket slidable on the top frame, a cover having a bow, a spring extending along the bow and connected at one end with same and at the other end with the bracket, and an adjusting screw carried by the spring adjacent to the bracket and arranged to force the said bow upwardly to stretch the cover.

9. An automobile top including a top frame, a flexible cover having transverse bows, means located at the front and back of the top frame for securing the flexible cover, and manually operable adjusting means located at spaced points along the top frame and engaging the bows between the ends thereof for stretching the cover.

10. An automobile top including a top frame, a flexible cover mounted on the top frame and provided at intervals with transverse bows, manually operable adjusting means arranged at intervals and connected with the top frame and engaging the bows between the ends thereof for stretching the cover.

11. An automobile top including a top frame, a flexible cover provided at intervals with bows, means located at the front of the top frame for detachably securing the cover, a device located at the back of the top frame and connected with the cover for stretching the same, and manually operable means located at intervals along the top frame and engaging the bows between the ends thereof for stretching the cover.

12. An automobile top including a top frame, a cover having bows, a device slidable along the top frame and provided with exteriorly arranged manually operable means engaging the bows between the ends thereof for stretching the cover at intervals.

13. An automobile top including a top frame, a cover provided at intervals with bows, a device slidable along the top frame and connected with the bows and provided with exteriorly arranged manually operable adjusting devices engaging the bows between the ends thereof for stretching the cover at intervals.

In testimony whereof I have hereunto set my hand.

ABRAHAM D. HEDGES.